(12) United States Patent
Shikama (10) Patent No.: US 6,563,826 B1
(45) Date of Patent: May 13, 2003

(54) METHOD OF CONTROLLING ERRORS IN A PACKETS TRANSMISSION LINK

(75) Inventor: Toshihiro Shikama, Rennes (FR)

(73) Assignee: Mitsubishi Denki Kabushiki Kaisha (JP)

( * ) Notice: Subject to any disclaimer, the term of this patent is extended or adjusted under 35 U.S.C. 154(b) by 0 days.

(21) Appl. No.: 09/324,760

(22) Filed: Jun. 3, 1999

(30) Foreign Application Priority Data

Sep. 6, 1998 (EP) .......................................... 98401382

(51) Int. Cl.[7] ................................................ H04K 1/16
(52) U.S. Cl. ...................................... 370/394; 714/748
(58) Field of Search ............................... 370/394, 242; 714/16, 18, 748, 749, 750, 751

(56) References Cited

U.S. PATENT DOCUMENTS

| | | | |
|---|---|---|---|
| 3,496,538 A | | 2/1970 | Van Dalen |
| 4,726,027 A | | 2/1988 | Nakamura et al. |
| 5,151,899 A | * | 9/1992 | Thomas et al. ............ 370/94.1 |
| 5,477,550 A | * | 12/1995 | Crisler ........................ 371/32 |
| 5,754,754 A | * | 5/1998 | Dudley et al. |
| 6,021,124 A | * | 2/2000 | Haartsen ..................... 370/336 |
| 6,292,470 B1 | * | 9/2001 | Uota ........................... 370/252 |

FOREIGN PATENT DOCUMENTS

| | | |
|---|---|---|
| JP | 60-30232 A | 2/1985 |
| JP | 63-97040 A | 4/1988 |
| JP | 11-35155 | 5/1989 |

OTHER PUBLICATIONS

D. Haccoun et al., "Node to Node Protocols on a High Speed Full–Duplex Satellite Link", Dept. of Elec. Engineer., Ecole Polytechnique de Montreal, Montreal, Canada, Dec. 3, 1978, pp. 28.1.1–28.1.5, XP–002085779.

D. Petras et al., "Performance Evaluation of the ASR–ARQ Protocol for Wireless ATM", Aachen Univ. of Technology (RWTH), Chair of Comm. Networks (COMNETS), Nov. 27, 1995, pp. 71–76, XP–002085780.

C.H.C. Leung et al., "A New Efficient ARQ Scheme for Satellite Communications", Computer Networks and ISDN Systems 23, Jan. 23, 1992, No. 4, Amsterdam, NL, pp. 229–240, XP–000246519.

* cited by examiner

*Primary Examiner*—Ken Vanderpuye
(74) *Attorney, Agent, or Firm*—Rothwell, Figg, Ernst & Manbeck, p.c.

(57) ABSTRACT

The invention relates to a method of controlling errors in the transmission of packets transmitted over at least one transmission link between a transmitter and a receiver, the said transmitter receiving from an input multiplex packets belonging to a plurality of end to end associations or groups of end to end associations and transmitting them in the form of sequences of packets over a transmission line, the receiver, on reception of a packet, verifying whether it is correctly received and if so, delivering it to an output multiplex, and if not, sending to the transmitter a negative acknowledgement so that the transmitter can re-transmit it.

This method inclusive, at the transmitter side, of allocating, to each packet to be transmitted over the transmission line, two indices, one giving the sequence number of the packet and the other enabling the packet to point to the last packet which was previously transmitted belonging to the same end to end association or the same group of associations as the packet, and, at the receiver side, in determining, on a correct reception of a packet, the packet pointed to by the received packet, and, if this packet pointed to has been delivered to the output multiplex, then delivering the received packet, otherwise not delivering it.

15 Claims, 11 Drawing Sheets

TABLE A

| VIRTUAL CIRCUIT (VC) | SEQUENCE NUMBER (SN) |
|---|---|
| α | 0 |
| β | 1 |

FIG. 9

| VC | SEQUENCE NUMBER (SN) | | | | | | | | |
|---|---|---|---|---|---|---|---|---|---|
|  | t11 | t12 | t13 | t14 | t15 | t16 | t17 | t18 | t19 |
| α | NULL | 0 | 0 | NULL | NULL | NULL | 1 | 1 | NULL |
| β | NULL | 1 | 3 | 4 | 5 | 0 | 0 | NULL | NULL |

| VC | SEQUENCE NUMBER (SN) | | | |
|---|---|---|---|---|
| | t41 | t42 | t43 | t44 |
| α | 0 | NULL | 5 | NULL |
| β | 2 | 4 | 4 | NULL |

| | | t61 | t62 | t63 | t64 | t65 | t66 | t67 | t68 | t69 | t70 |
|---|---|---|---|---|---|---|---|---|---|---|---|
| ADDR | S/N | N N | N N | a 0 | a 0 | a 0 | N N | N N | d 0 | d 0 | d 2 | N N |
| ADDR | S/N | N N | N N | N N | b 1 | b 1 | b 1 | N N | N N | e 1 | e 1 | N N |
| ADDR | S/N | N N | N N | N N | N N | c 2 | c 2 | c 3 | c 3 | c 3 | N N | N N |

METHOD OF CONTROLLING ERRORS IN A PACKETS TRANSMISSION LINK

BACKGROUND OF THE INVENTION

FIELD OF THE INVENTION

The present invention concerns a method of controlling errors in packets transmitted on at least one transmission link between a transmitter and a receiver. The present invention applies essentially in cases where the said link can support a plurality of virtual circuits.

DESCRIPTION OF THE BACKGROUND ART

Figure 1:
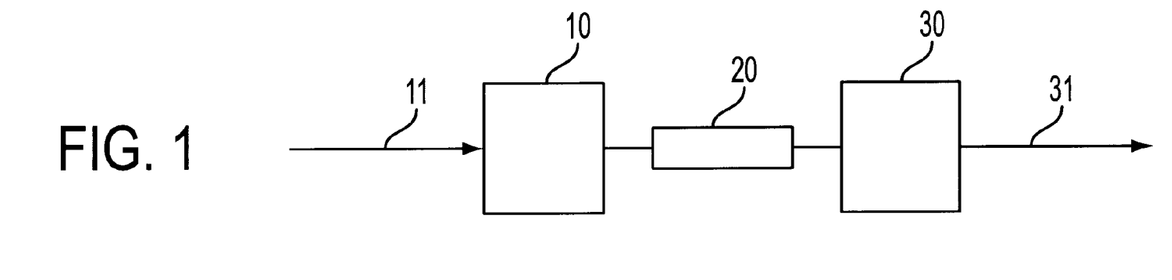
FIG. 1 is a block diagram of a transmission system to which the present invention can be applied.

The present invention applies to a transmission system of the type depicted in FIG. 1. In this FIG. 1, a transmitter 10 can be seen which receives, from an input multiplex 11, packets which may belong to several different virtual circuits. This transmitter 10 transmits, to a receiver 30 via a transmission line 20, the packets which it receives from the multiplex 11, in the form of a sequence of packets. On receiving the packets from the transmission line 20, the receiver 30 implements a method of controlling errors which took place during the transmission. More particularly, the packets received in the order of the sequence are delivered to an output multiplex 31. On the other hand, if the packet received does not have the required sequence number in the sequence notably because of a loss of one or more packets, it is not delivered to the output multiplex 31 as long as the lost packet or packets have not been received or as long as the maximum waiting time has not expired.

Figure 2:
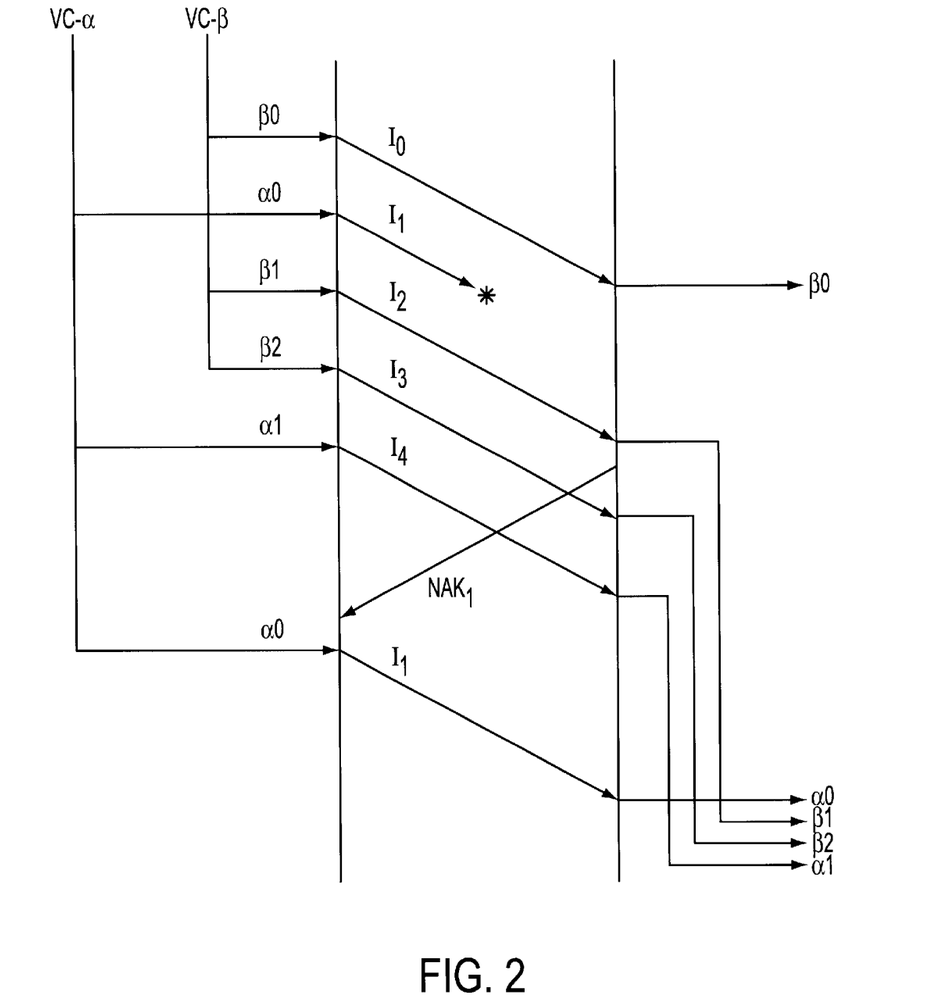
FIG. 2 is a diagram illustrating an error control method in accordance with the methods of the prior art.

This error control method is generally known as Selective-Repeat ARQ. The implementation of this method is illustrated in FIG. 2. The left-hand part of this FIG. 2 is a diagram showing, at the transmitter, the transmission of packets as a function of time (the time elapses downwards) and the right-hand part is a diagram showing, at the receiver, the reception of transmitted packets also as a function of time. As for the central part, this depicts the transmission of the packets over the transmission line.

Two virtual circuits VC-α and VC-β are multiplexed on the transmission line between the transmitter and receiver. Each packet transmitted over the transmission line bears a sequence number which identifies it, in the sequence of transmitted packets, with respect to the preceding ones and the following ones.

As can be seen in this diagram, the packet $I_0$ (the first packet in a sequence of packets) which belongs to the second virtual circuit VC-β has been received correctly. This packet $I_0$ is then delivered to the output multiplex 31.

The packet $I_1$ on the other hand has been lost and is therefore not received by the receiver 30. On reception of the packet $I_2$, the receiver 30 notes that the sequence number in the sequence is not the one required. It is in fact 2 whereas it is the packet $I_1$, and therefore with the sequence number 1, which is expected. The receiver 30 therefore sends to the transmitter 10 a negative acknowledgement $NAK_1$ thus requesting the transmitter 10 to re-transmit the packet $I_1$.

As for the packets $I_2$ to $I_4$, they have been correctly received by the receiver. However, because the packet $I_1$ has not been correctly received, they too are not delivered and are then stored whilst awaiting their delivery. It will also be said that they are kept.

After the transmission of the packet $I_4$, the transmitter 10 receives the negative acknowledgement $NAK_1$ concerning the packet $I_1$ and consequently re-transmits this packet $I_1$, which is received later at the receiver. As can be noted, the receiver delivers to the output multiplex not only the packet $I_1$ but also the packets $I_2$ to $I_4$ which had been kept up till now.

Thus, according to this method, the packets which have been received after the loss of a packet are not delivered and are kept, until the packet is correctly received.

It is possible that the packet $I_1$ may not always be correctly received by the receiver 30. Conventionally, the packets $I_2$, $I_3$ and $I_4$ are then delivered after the expiry of a predetermined time, referred to as the maximum waiting time.

It will be noted that such a process requires only the sequence number of sending of the packets in the current sequence in order to function correctly.

However, when several virtual circuits are multiplexed on one and the same transmission link between a transmitter and receiver, it may happen that packets belonging to one virtual circuit are kept because a packet belonging to another virtual circuit has been lost. This eventuality is also illustrated in FIG. 2, where it can be seen that the packets $I_1$ and $I_4$ belong to the same virtual circuit VC-α and that the packets $I_0$, $I_2$ and $I_3$ belong to the other virtual circuit VC-β. The packets $I_2$ and $I_3$ of the virtual circuit VC-β are kept whereas, with regard to this circuit VC-β, no packet has been lost. Thus the lost packet $I_1$ belonging to the virtual circuit VC-α blocks the delivery of the packets of the virtual circuit VC-β.

In order to solve this problem, a method is known from U.S. Pat. No. 4,726,027 document for a Go-Back-N protocol. According to this method, at the transmitter side, each packet is allocated with two indices: one is an identifier of the logical link to which the packet belongs and the other is the order of transmission of the packet regarding this logical link. When a packet is not correctly received, a negative acknowledgement is sent to the transmitter in order to retransmit it. Only the successively received packets which belong to the same program application are discarded, the others being delivered.

Figure 3:
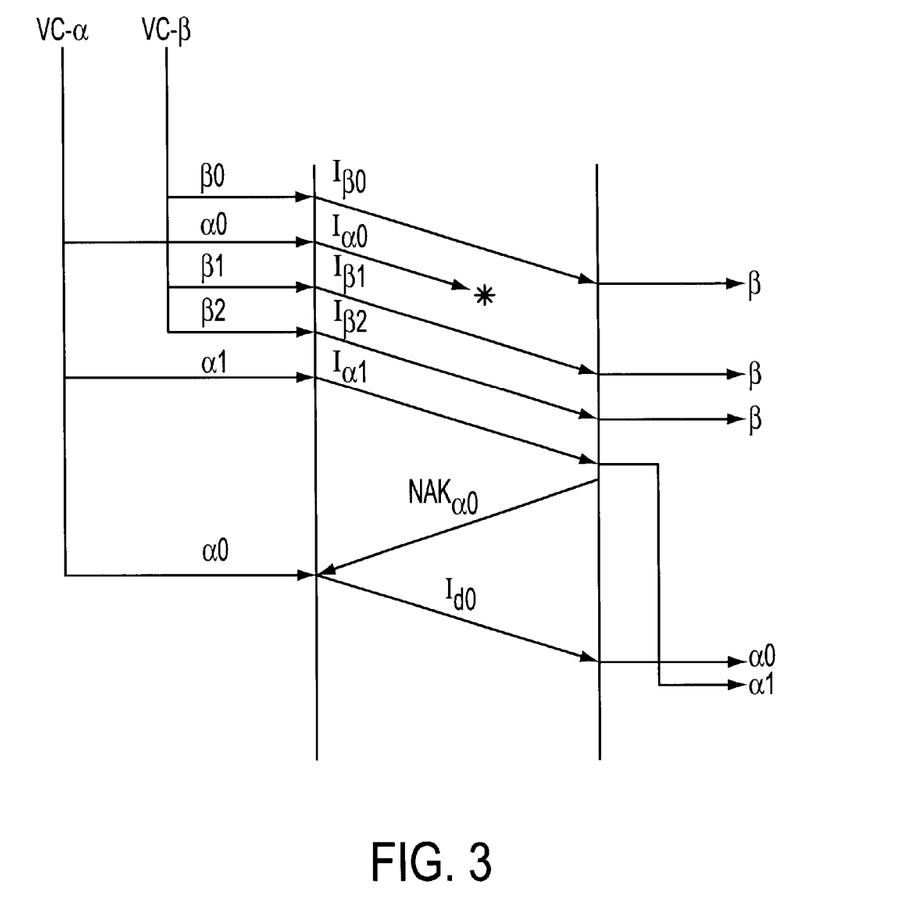
FIG. 3 is another diagram illustrating an error control method in accordance with a method of the prior art

FIG. 3 shows an example of an application of this method modified to be applied as a Selective Repeat protocol.

In this FIG. 3, the packet Iβ0 belonging to a virtual circuit VC-β is correctly received and is delivered. The packet Iα0 belonging to an another virtual circuit VC-α is not received.

Contrary to the preceding scheme, although the preceding packet Iα0 has not been received, the packet Iβ1 belonging to the virtual circuit VC-β is delivered since it is correctly received.

Note that the receiver doesn't still notice that packet Iα0 is not correctly received. It does when the packet Iα1 belonging to the same virtual circuit as the lost packet Iα0 is received. Then, the packet Iα1 is kept and a negative acknowledgement NAKα0 is sent to the transmitter for retransmission. When packet Lα0 is correctly received, the packets α0 and α1 are delivered.

Although the U.S. Pat. No. 4,726,027 overcome the problem raised above, the drawback of the method is the delay for the receiver to notice that a packet from a virtual circuit is not correctly received.

Furthermore, this method would need to transmit a packet with an identifier of the virtual circuit and its order of transmission for that virtual circuit, which generally requests a too large number of bits.

Furthermore, this method would need to modify the Selective Repeat ARQ protocol at both transmitter and receiver sides in order to be aware of the logical link to which a retransmitted packet belongs.

SUMMARY OF THE INVENTION

The aim of the present invention is therefore to resolve the above-mentioned problems in the case of multiplexing of several virtual circuits on the transmission link.

In order to achieve these aims, the method of the present invention consists, at the transmitter side, in allocating, to each packet to be transmitted over the or a transmission line, two indices, one giving the sequence number of the said packet and the other enabling said packet to point to the last packet which was previously transmitted belonging to the same virtual circuit as the said packet, and, at the receiver side, in determining, on a correct reception of a packet, the packet pointed to by the said received packet, and, if this packet pointed to has been delivered to the output multiplex, then delivering the said received packet, otherwise not delivering it.

According an another characteristic of the present invention, the method consists, at the receiver side, in keeping the packets which are not delivered and, in delivering, when correctly received, a re-transmitted packet and then in seeking amongst the keeping packets the one, if it exists, which points to said retransmitted packet and then delivering it, and once again in seeking, if it exists, the packet which points to the latter packet and delivering it and so on until there is no packet which points to the one delivered previously.

BRIEF DESCRIPTION OF THE DRAWINGS

The characteristics of the invention mentioned above, along with others, will emerge more clearly from a reading of the following description of several embodiments of the invention, the said description being given with regard to the accompanying drawings, amongst which.

DETAILED DESCRIPTION OF THE INVENTION

Since the applications of the method which are given in the present specification are interested with ATM technology, the notion of "virtual circuit" is generally used. Sometimes, address is also used.

But, it must be understood that the present invention is concerned with all sorts of each end-to-end association or of group of end-to-end associations.

In the case of X.25 packet switching network, a virtual circuit is such typical association suitable for resequencing. In the ATM network, a virtual channel (VC) or a virtual path (VP) is such association. In the case of Internet, since there is no connection in the upper layer, there are a lot of possibilities. Use of destination address is one possibly, where a lot of end-to-end associations may use the same destination address. These associations form a group. Order of packets belonging to this group are kept by the resequencing. Use of source and destination address pair is another possibility, where multiple end-to-end association may use the same address pair. To say more precisely, it is possible to add port number to the source and destination address.

The present invention applies to a transmission system of the type depicted in FIG. 1, which comprises a transmitter 10 which receives, from an input multiplex 11, packets which it transmits in the form of a sequence of packets, over a transmission line 20, to a receiver 30. On receipt of the packets from the transmission line 20, the receiver 30 implements a control method according to the present invention. The packets received correctly by the receiver 30 are then delivered to an output multiplex 31.

According to the present invention, at the transmitter 10, two indices i and j are allocated to each packet to be transmitted over the transmission line. The first index i represents the sequence number in the sequence of the packet to be transmitted and the second index j constitutes a pointer pointing to the last packet in the same virtual circuit which was previously transmitted over the transmission link 20.

At the receiver 30, on receipt of a packet $I_{i,j}$, which will subsequently be referred to as the packet just received, a check is made whether its sequence number i corresponds to the one expected. If not, this means that at least one packet has been lost. A negative acknowledgement is then immediately sent to the transmitter 10 for this or each of these lost packets.

In both cases, either the sequence number i corresponds to the one expected or not, the last packet that has been previously received and that belongs to the same virtual circuit as the just received packet $I_{i,j}$, also referred to as the packet pointed to, is determined by means of the second index j.

If the determined packet has previously been delivered to the output multiplex 31, the packet $I_{ij}$ is also delivered.

If the determined packet has not been still delivered, either because it has not been received, or because it has been kept, the just received packet $I_{ij}$ is also kept, that is to say it is stored in a buffer memory without being delivered.

Furthermore, when the packet $I_{ij}$ just received is a packet whose receipt is awaited because of its retransmission, it is first processed as before. If it happens that it is delivered to the output multiplex 31, then, amongst the kept packets, the one which, if it exists, points to it is sought. The packet which points to the packet just received is also delivered. Also the packet which, if it exists, points to the first packet pointed to is sought and delivered, and so on until there is no packet which points to the one delivered lastly.

According to a first embodiment of the invention, the second index j represents the sequence number in the sequence of the last packet of the same virtual circuit which was previously transmitted over the transmission link 20. Thus the first index of the packet pointed to by the packet just received $I_{ij}$ is necessarily equal to the second index j of the packet just received $I_{ij}$ and is therefore identified by $I_{j,x}$. The index x signifies that it exists but that it is not significant in the method.

According to another embodiment of the present invention, the second index j represents the difference between the sequence numbers of the packet considered and the last packet belonging to the same virtual circuit.

In this second embodiment, at the receiver, on receipt of a packet $I_{ij}$, the last packet received which belongs to the same virtual circuit is determined. Its first index is equal to the difference between the two indices i-j and is then denoted $I_{i-j,x}$.

As before, if the packet thus pointed to $I_{i-j,x}$ has previously been delivered to the output multiplex 31, the packet $I_{ij}$ is itself delivered. On the other hand, if it has not been delivered, the packet $I_{ij}$ is kept.

Figure 4A:
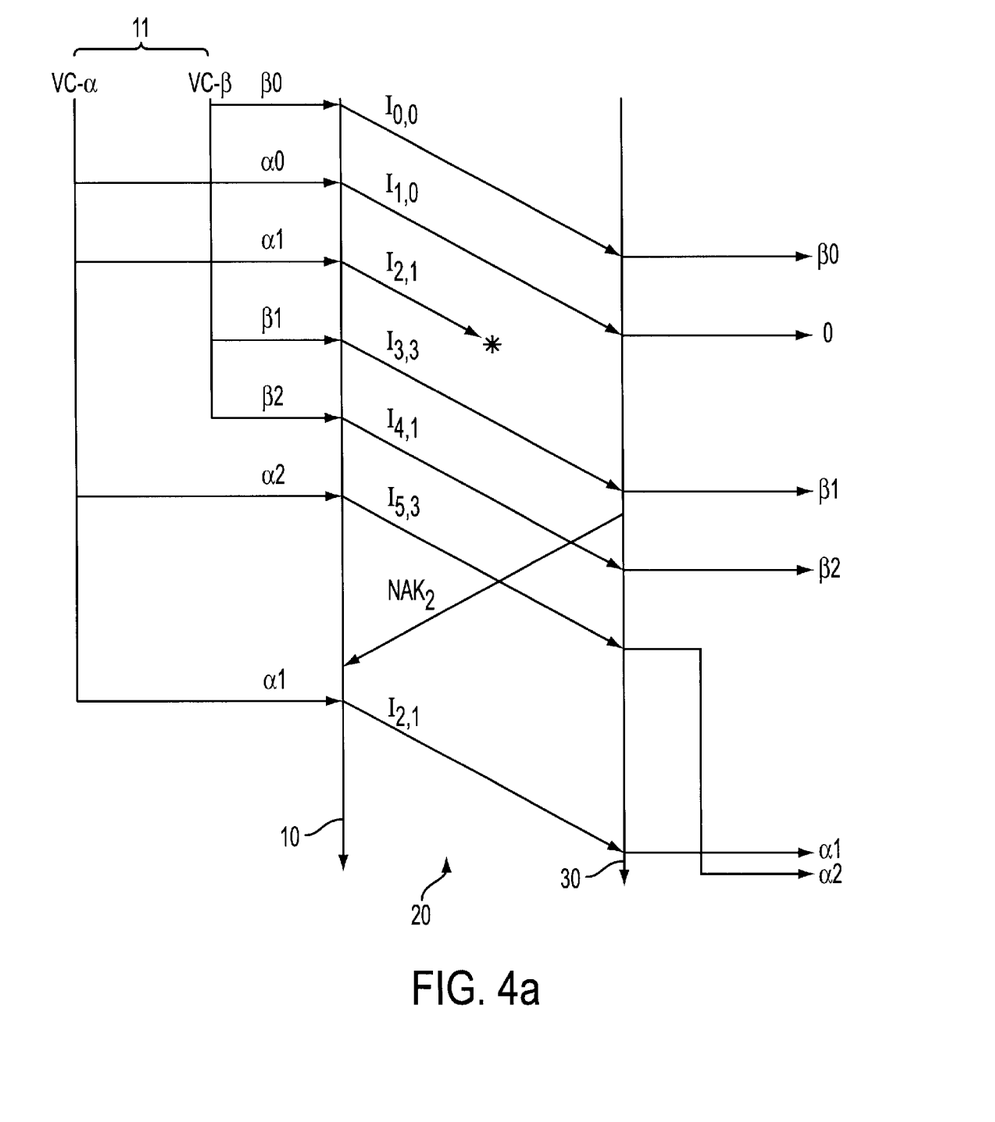
FIG. 4a is a diagram illustrating a first implementation of an error control method according to the present invention.

FIG. 4a illustrates an example implementation of this second embodiment. It can be seen notably that the packets which belong to two virtual circuits VC-α and VC-β of the input multiplex 11 are transmitted over a transmission line 20. Each new packet transmitted over the transmission line has its first index i incremented by one unit with respect to the previous one. It can be seen that the second index of each packet represents the difference between the sequence numbers in the sequence respectively of the packet considered and the packet belonging to the same virtual circuit preceding it.

Thus, by way of example, the packet $I_{4,1}$ is the packet with sequence number 4 in the transmission sequence and refers to the packet with sequence number 4−1=3, that is to say $I_{3,3}$, which is indeed the packet preceding the packet $I_{4,1}$ belonging to the same virtual circuit. Likewise, by way of example, the packet $I_{3,3}$ is the packet with sequence number 3 in the transmission sequence and refers to the packet of the same virtual circuit with sequence number 3−3 =0, that is to say $I_{0,0}$.

In the diagram in FIG. 3a, it can be seen that the third packet $I_{2,1}$ in the sequence has not been received. This event is represented by an asterisk between the line representing the transmitter 10 and the line representing the receiver 30.

When the packet $I_{3,3}$ is received, the receiver 30 notes that its sequence number does not correspond to the sequence number of the expected packet, in this case the packet $I_{2,1}$ with sequence number 2. A negative acknowledgement $NAK_2$ (the index 2 signifying that it concerns the packet $I_{2,1}$ with sequence number 2) for the expected packet $I_{2,1}$ is then sent to the transmitter 10.

The received packet $I_{3,3}$ is then processed. To do this, the difference is calculated between the two indices and 0 is found. The packet then pointed to, which is the packet $I_{0,0}$, has been delivered to the output multiplex 31. The packet $I_{3,3}$ is then also delivered.

The process is the same for the packet $I_{4,1}$.

As for the packet $I_{5,3}$, it points to the packet $I_{5-3,x}$, which is in this case the packet $I_{2,1}$. The latter packet has not yet been received and it follows that it is not delivered to the multiplex 31 and is then kept.

On reception, at the transmitter side, of the negative acknowledgement $NAK_2$, the packet $I_{2,1}$ is re-transmitted over the transmission line. When it is received, at the receiver, the packet $I_{2,1}$ is delivered to the output multiplex 31 since it points to the packet $I_{1,0}$ which has been delivered. The packet which points to it, namely the packet $I_{5,3}$, is also delivered to the multiplex 31. The latter packet $I_{5,3}$ is not pointed to by any other packet.

It will be noted that the first packet transmitted which belongs to a given virtual circuit has a second index which is equal to 0.

The same applies to a packet where all the previous packets belonging to the same virtual circuit have been the subject, at the transmitter, of the receipt of a positive acknowledgement. The same also applies to a packet where all the previous packets have been rejected because they have not been the subject of an acknowledgement after the expiry of a predetermined time.

With regard to the example illustrated by the diagram of FIG. 4a, it can be seen that, by means of the present invention, all the packets which belong to the virtual circuit of a previous packet which had not been received are kept and that the packets belonging to the other virtual circuits are delivered independently. Thus the loss of a packet does not block subsequent packets which do not belong to the same virtual circuit as itself.

Figure 4B:
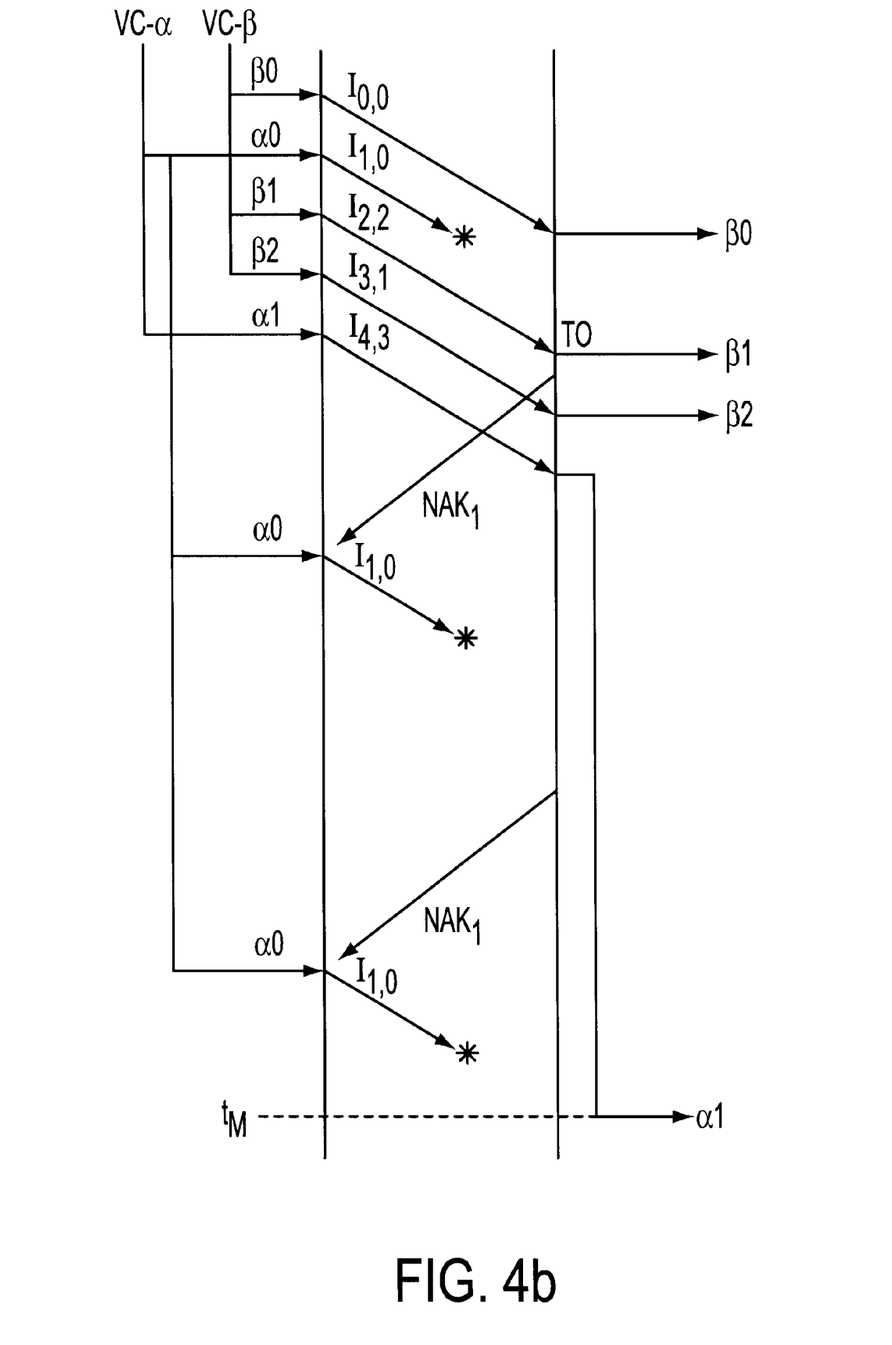
FIG. 4b is a diagram illustrating a second implementation of an error control method according to the present invention.

FIG. 4b depicts another example of an illustration of the method of the present invention. The packet $I_{1,0}$ is the packet which has not been received. On reception of the packet $I_{2,2}$, the receiver transmits a negative acknowledgement $NAK_1$ to the transmitter. The packet $I_{2,2}$ is also delivered to the output multiplex. Because it belongs to the same virtual circuit as the lost packet $I_{1,0}$, the packet $I_{4,3}$ is kept whilst awaiting the re-transmission and correct reception of packet $I_{1,0}$ and is then delivered with it. However, at time $t_M$ corresponding to the expiry of a maximum waiting period, also referred to as the lifetime, as from the time $t_0$ corresponding to the moment when the receiver notes the loss of the packet $I_{1,0}$, the packet $I_{1,0}$ has still not been delivered. In this case, although the packet $I_{1,0}$ has not been still correctly received, the packet $I_{4,3}$ is delivered to the output multiplex 31.

It will be noted that a second negative acknowledgement $NAK_1$ has been transmitted by the receiver at the expiry of a maximum period of awaiting reception of the second transmission of the packet $I_{1,0}$.

In general terms, and therefore all the more so in the embodiments described above, the second index is coded digitally in a certain number of bits, for example 4 bits. The result of this coding is that the second index can take only a limited number of values, for example 16 values. The said second index is therefore upwardly delimited.

It may happen that, for a given virtual circuit, the value which the said second index should normally take is higher than the value which delimits this second index (for 4 bits, the value of the upper delimiter is 15). This may be the case, if the second index represents the difference between the sequence numbers of the packets of the same virtual circuit, when this difference is greater than this delimiter value.

According to the invention, at the transmitter, a second index j is then allocated a specific value j*. At the receiver, on reception of a packet $I_{ij}$ whose second index j has this specific value j*, it is first determined whether all packets of the sequence belonging to all virtual circuits previously sent by the transmitter have already been received by the receiver and delivered to the output multiplex.

If all the previous packets of the sequence have been delivered, then the packet just received $I_{ij}$ is also delivered. On the other hand, if such is not the case, the packet just received $I_{ij}$ will be kept until all the previous packets are delivered.

Figure 5:
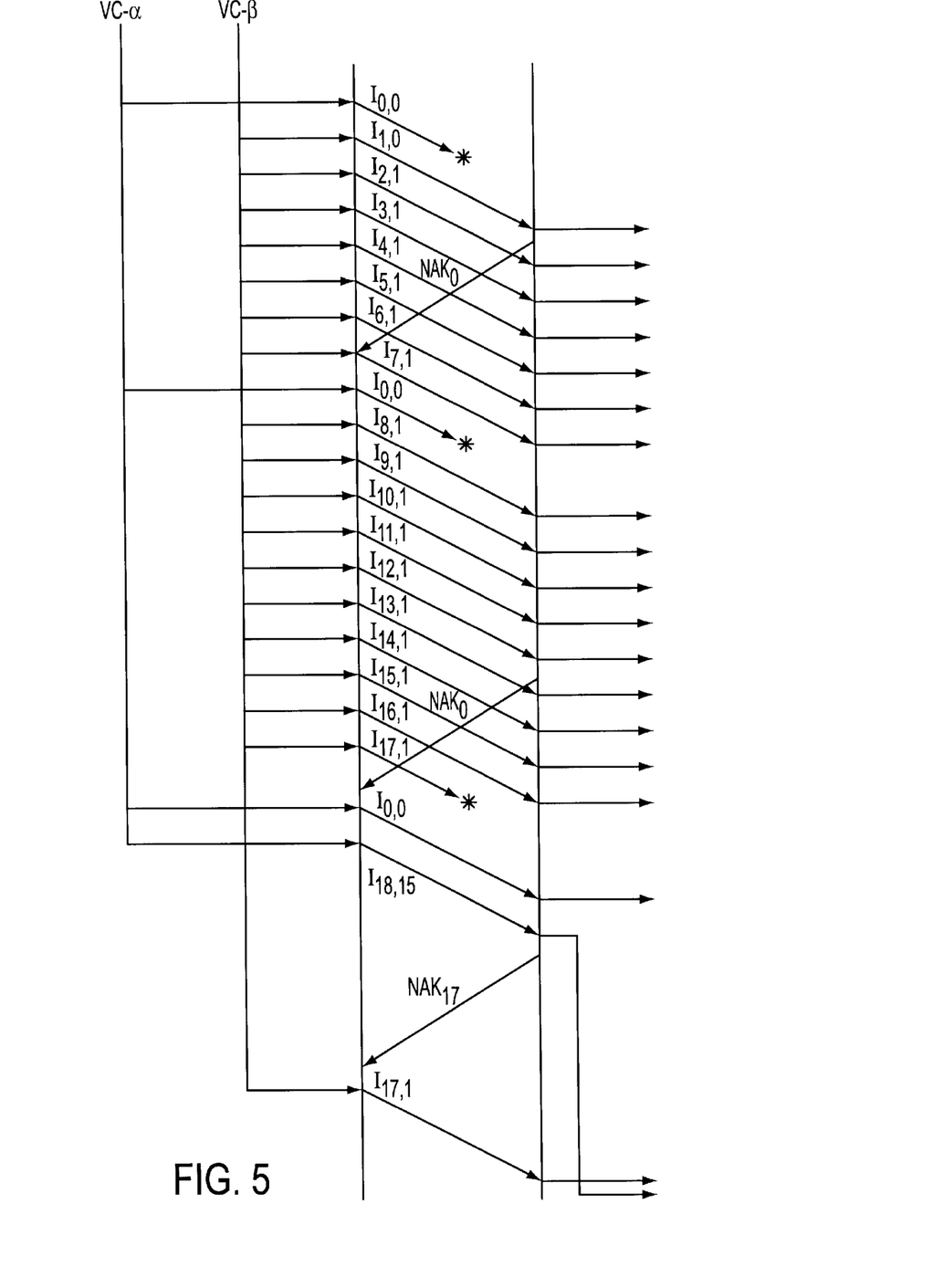
FIG. 5 is another diagram illustrating another aspect of an error control method according to the present invention.

This aspect of the invention is illustrated by the diagram of FIG. 5, where a packet $I_{0,0}$, which belongs to a virtual circuit VC-α, has been re-transmitted twice before being delivered. At the last re-transmission, 17 packets belonging to a second virtual circuit VC-β have already been transmitted, but the last one $I_{17,1}$ has not been received. The second packet of the virtual circuit VC-α is transmitted just after the second re-transmission of the packet $I_{0,0}$. It should be identified by $I_{18,18}$ but the coding of the second index, being assumed to be in 4 bits, has its value upwardly delimited at 15. It therefore bears the second index of specific value j*, which is in this case 15.

On reception of this packet $I_{8,15}$, the receiver verifies that all the previous packets in the sequence ($I_{j,x}$ with j=0 to 17) have been delivered. In the example, this is not the case because the packet $I_{17,1}$ has not been received. So, the packet just received $I_{18,15}$ is kept until the packet $I_{17,1}$ is received and delivered.

For implementing the method of the invention, the use of two octets can be provided for, which are then allocated, at the transmitter, to the packet to be sent over the transmission line. The first octet gives the sequence number of the packet in the sequence and the second gives the sequence number of the packet pointed to in 7 bits, the eighth bit being used as a flag in order to know whether or not reference is being made to another packet.

Another implementation would consist of reserving the octet 00H (the letter H signifies that the value is given in hexadecimal) for cases where reference is not made to another packet and the octets 01H to FFH for indicating the difference between the numbers of the present packet and the packet pointed to. Thus 255 packets are able to be pointed to.

Another implementation would consist of allocating only 4 bits to the second index, as follows:

0H for cases where reference is not made to another packet, 1H to EH for indicating the number of packets between the present packet and he packet pointed to, FH for indicating that the previous packet is the last packet in the sequence and not the last packet of the virtual circuit considered.

Figure 6:
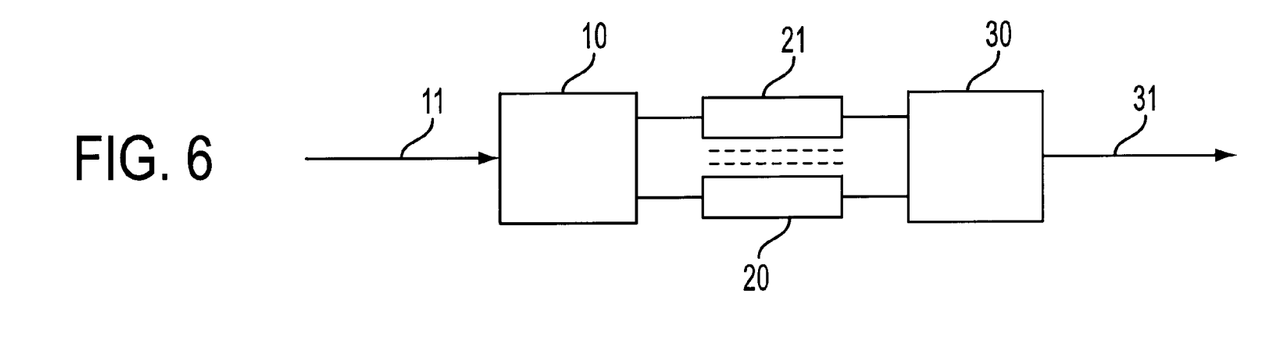
FIG. 6 is a block diagram of a transmission system to which the present invention applies, the said system being provided with a plurality of transmission lines into the transmitter and receiver.

The present invention also applies to a transmission system of the type depicted in FIG. 6. In this FIG. 6, a transmitter 10 can be seen which receives, from an input multiplex 11, packets which may belong to several different virtual circuits. This transmitter 10 transmits the packets which it receives from the multiplex 11, no longer over a single transmission line 20, but over several transmission lines 21 to 2n. This transmission over several transmission lines is governed by a process which does not form an integral part of the present invention and which will therefore not be described in any more detail. Nevertheless, it will just be noted that this process is such that it is possible that packets which belong to the same virtual circuit may not be transmitted over the same transmission line.

On receipt of the packets from one of the transmission lines 20 to 2n, the receiver 30 implements, as before, an error control method of the ARQ (automatic repeat request) type, which is the subject of another embodiment of the present invention. The packets received correctly by the receiver 30 are then delivered to an output multiplex 31.

According to this embodiment, at the transmitter 10, there are allocated to each packet to be transmitted over one of the transmission lines, two indices i,j which, as before, represent respectively the sequence number in the transmission sequence over the transmission line where the packet considered is transmitted and an identifier pointing to the last packet transmitted belonging to the same virtual circuit. In this case, the index j has two dimensions and can therefore be written as a combination of two indices j1 and j2 representing respectively the identifier of the transmission line over which the said last packet was transmitted, and a pointer giving the sequence number in the transmission sequence of the last packet transmitted over this transmission line.

On receipt of a packet $I_{ij1j2}$ on a transmission line, the last packet received belonging to the same virtual circuit is determined. This packet was transmitted over the transmission line identified by J1 and its transmission sequence number is given by j2. It can therefore be designated by $I_{j2,x,y}$ and is to be sought, at the receiver, in the packets received from the transmission line j1.

If this packet $I_{j2,x,y}$ has previously been delivered to the output multiplex 31, the packet $I_{ij1j2}$ is also delivered. On the other hand, if the packet $I_{j2,x,y}$ has not been delivered to the output multiplex 31, either because it has not yet been received or because it has been kept, the packet $I_{ij1j2}$ is kept.

As previously, if the received packet $I_{ij1j2}$ corresponds to a packet which had not yet been received and was therefore awaiting reception, a search will be made in the kept packets for the one which, if it exists, points to it. If it is assumed that the packet $I_{ij1j2}$ has been received on reception from the transmission line whose identifier is n, the packet which points to it is then the packet $I_{x,n,i}$. The packet $I_{ij1j2}$ and the packet $I_{x,n,i}$ are then delivered to the output multiplex 31. A search will also be made for the packet which, if it exists, points to this last packet $I_{x,n,i}$ and it will be delivered, and so on, until there is no packet which points to the one delivered lastly.

Figure 7:
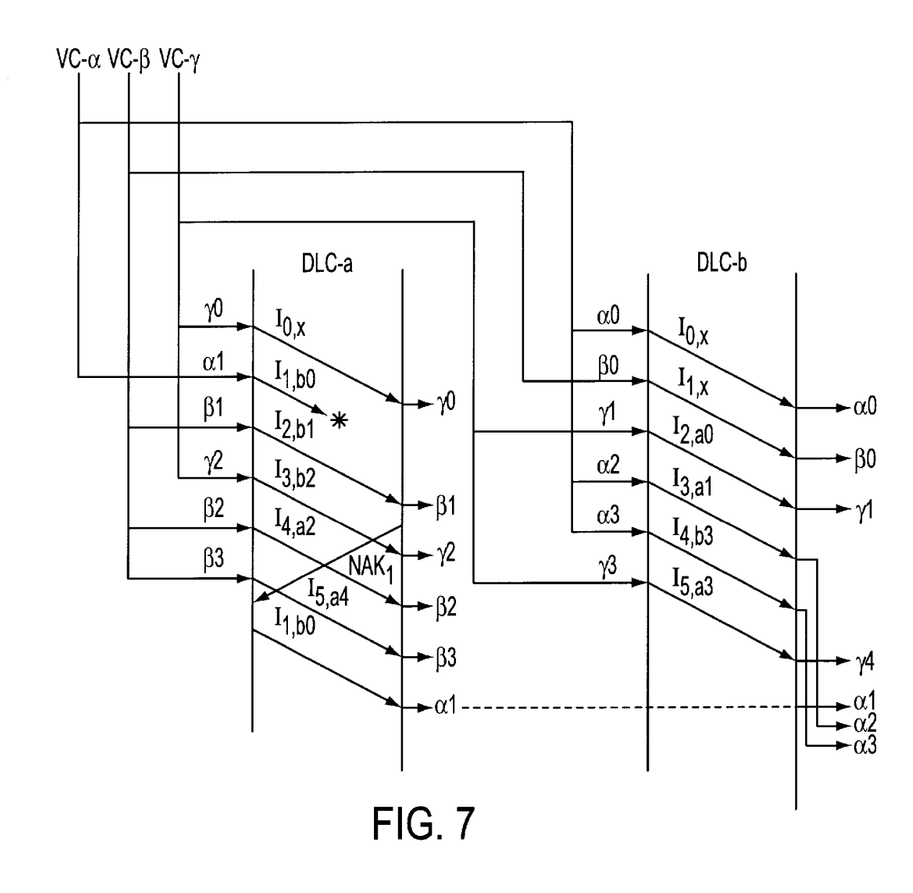
FIG. 7 is a diagram illustrating an error control method according to the invention in the case of an application to a transmission system according to FIG. 6.

FIG. 7 illustrates this process, in the case where three virtual circuits VC-α, VC-β and VC-γ are multiplexed on two transmission lines whose identifiers are respectively denoted a and b.

It can be seen that, for each transmission line a and b, the first index of the transmitted packets increases progressively as they are transmitted.

If for example the packets belonging to the virtual circuit β are considered, it can be seen that the packet $I_{1,x}$ is the packet with sequence number 1 (second packet) in the transmission sequence which has been transmitted over the transmission line identified by b, and that the packet $I_{2,b1}$, which is the packet with sequence number 2 (third packet) in the transmission sequence of the transmission line identified by a, points to it. This is because the second index b1 of the packet $I_{2,b1}$ indicates that it is a case of the packet whose sequence number in the transmission sequence of the transmission line identified by b is 1. It is indeed a case of the packet $I_{1,x}$.

It can be seen, from the asterisk on the transmission line a, that the packet $I_{1,b0}$ has not been received. It can also be seen that the following packets belonging to the same virtual circuit VC-α, that is to say the packets $α_2$ and $α_3$ transmitted via the transmission line b by the respective packets $I_{3,a1}$ and $I_{4,b3}$, are kept, until the packet $I_{1,b0}$ has been received correctly, at the receiver for the transmission line a. The packet $I_{1,b0}$ is re-transmitted when the transmitter for the transmission line a has received the negative acknowledgement $NAK_1$.

On reception of the packet $I_{1,b0}$ at the receiver for the transmission line a, this packet $I_{1,b0}$ is delivered and then the packet which points to it is sought. The second index of this packet is necessarily a1 since the packet $I_{1,b0}$ has been sent over the transmission line referenced a and is the packet with sequence number 1 thereof, and it will be sought at the receiver both for the transmission line a and for the transmission line b.

It can be seen that it is a case of the packet $I_{3,a1}$ received at the reception of the transmission line b which is then also delivered.

It is also sought whether this packet $I_{3,a1}$ is pointed to by another packet. If this packet exists, its second index is necessarily $b_3$. It can be seen that it is then a case of the packet $I_{4,b3}$ which is then also delivered.

Thus, again as before, only the packets belonging to the same virtual circuit of a previous packet which has not been received are kept, the other packets being processed independently.

The size of sequence number i is generally limited. In the normal HDLC protocol, for example, 3 bits are used for the sequence number, where the same value is reused cyclically such as 0, 1, 2, 3, 4, 5, 6, 7, 0, 1, 2, etc. In this case, modulo 8 operations are used to calculate differences of two sequence numbers. Note that (x modulo 8) operation means taking a remainder of (x divided by 8).

Figure 8:
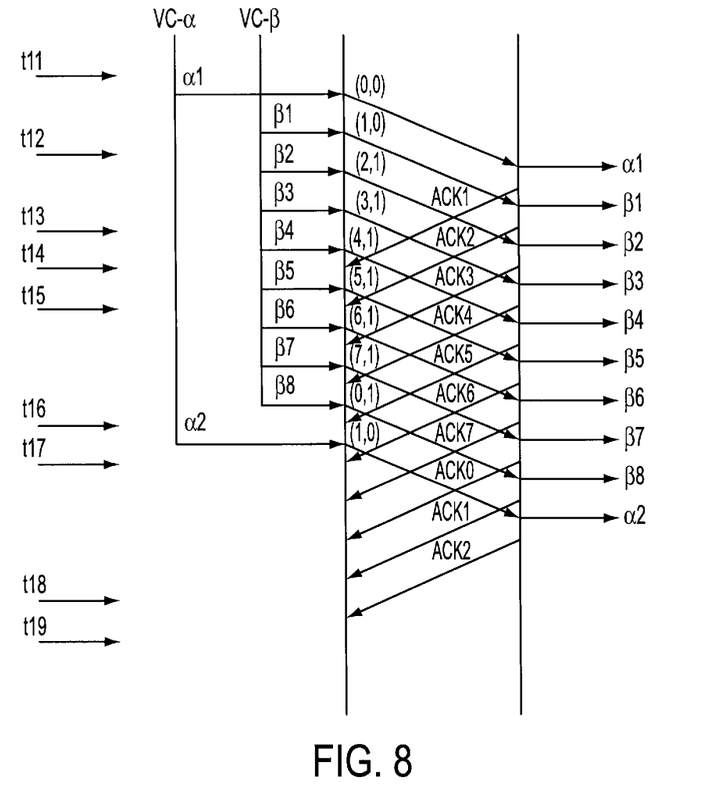
FIG. 8 is a diagram illustrating a case wherein the size of sequence number is limited.

Illustrated in FIG. 8 is a case where, after a first packet α1 belonging to VC-α is sent, eighth packets β1–β8 belonging to VC-β are sent. When a packet α2 is sent, its second index j is calculated as the difference between its sequence number and the sequence number of the pointed packet α1 modulo 8:

$$j=\{((1-0) \text{modulo } \mathbf{8}\}=1$$

since the assigned sequence number of the previous packet α1 is 0 and the assigned sequence number of the packet α2 is 1.

The problem raised here is that this second index value makes packet α2 pointing to packet β8.

To solve this problem, the present invention consists in associating with each virtual circuit for which at least a packet has not been still acknowledged, an associated value which is equal to the sequence number of the last packet of said virtual circuit which have not been still acknowledged.

Hereafter a state of a transmitted packet, which is waiting for an acknowledgement, is called outstanding.

According to a first embodiment of the invention, the method consists in implementing, at the transmitter side 10, a table (see FIG. 9) which has a row per virtual circuit, and for associating a value with a virtual circuit, in storing said value in said row, and for deleting such an association, in storing a special value in the corresponding row.

Figure 9:
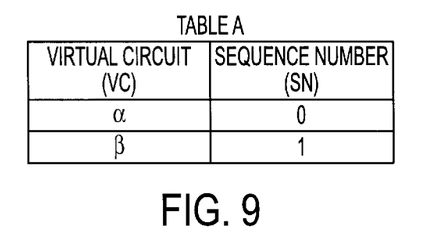
FIG. 9 represents a table of a first type which is used in an embodiment of the present invention.

Therefore, for each virtual circuit, if there are outstanding packets, the last sequence number among the outstanding packets is set in the row corresponding to the virtual circuit in the table. If there is no outstanding packet, i.e. all previous packets belonging to the considered virtual circuit are acknowledged, special value, e.g. NULL, is set. This special value is a value indicating that this is not a normal sequence number value.

When sending a new packet, transmitter 10 checks if a value is associated with said virtual circuit and set the second index j value as explained below.

According to the first embodiment, transmitter 10 checks if the value of the sequence number stored in the row of the table corresponding to the same virtual circuit of this packet.

In one hand, if the sequence number corresponding to the associated value exists (in case of a table, the associated value is not the special value NULL), then the second index j value is set to the difference modulo M between the sequence number of the packet to be transmitted and the sequence number associated with the same virtual circuit. M is a modulo size of the sequence number.

In the other hand, if no value is associated with said virtual circuit (in case of a table, the associated value is the special value NULL), the second index j value is set to zero, meaning that resequencing is not needed for this packet if received correctly by the receiver.

After having sent the packet, the transmitter associates its sequence number to the virtual circuit. In case of a table, its sequence number is stored in the row of the table corresponding to the virtual circuit.

When a retransmission of a packet is performed, the transmitter checks whether the packet pointed by this packet, if there is any, has been already acknowledged. If it has not been acknowledged, the same packet shall be sent (same sequence number and same second index j as those of the considered packet). If it has been acknowledged, the second index value j of the retransmitted packet shall be updated to zero meaning hat resequencing is not needed.

One scheme judging whether the pointed packet is acknowledged or not can be one as follows.

Let R be the sequence number of the retransmitted packet.
Let P be the sequence number of the pointed packet by the retransmitted packet.
Let Q be the sequence number of the last acknowledged.
Let M be the size of modulo.
If the following condition is satisfied, the pointed packet has been acknowledged.

$$\{(R-P) \text{modulo } M\} \geqq \{(R-Q) \text{modulo } M\}$$

Note that, since {(R–P) modulo M} is the value of the second index set in the packet, above process can be done by the following more simply.

$$\{\text{Original second index value of the retransmitted packet}\} \geqq \{(R-Q) \text{ modulo } M\}$$

When an acknowledgement is received, the transmitter gets the virtual circuit identifier of the acknowledged packet, and then finds the value associated with the virtual circuit. In case of a table, this value is stored in the row including the virtual circuit. In one hand, if the associated value is equal to the sequence number of said acknowledged packet (this means that there is no outstanding packet for this virtual circuit), the association is deleted, i.e. in case of a table, the associated value is set to the special value NULL. In the other hand, if the associated value is not the same, it is not modified.

Note that if multiple packets are acknowledged, this process shall be done for each acknowledged packet.

Figure 10:
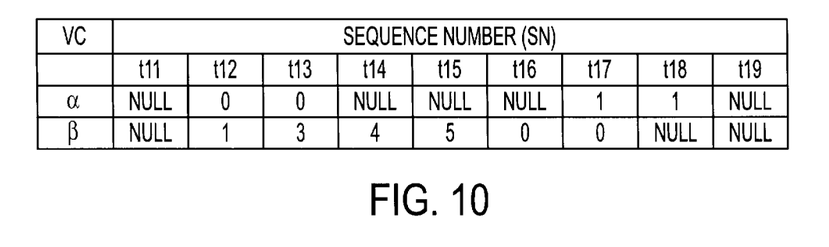
FIG. 10 is a table of a second type which is used in an embodiment of the present invention, in which the stored values are those corresponding to the diagram of FIG. 8.

FIG. 10 shows the changes of the associated values stored in a table as such that represented in FIG. 8, for time instances t11, t12, . . . , t19 shown in FIG. 7 respectively before packet α1 has been sent, after packets β1, β3 have been sent, after acknowledgement packet ACK1 has been received, after packets β5, β8, α2 have been sent and after acknowledgement packets ACK1 and ACK2 have been received.

At time t11, there is no packet sent on both virtual circuits α and β. Then, the stored value is the special one NULL for both virtual circuits. Then, as shown in FIG. 8, first packets α1 and β1 are sent with the second index value j equal to zero.

At time t12 one packet has been sent on each virtual circuit α and β. The sequence number of the packet is stored in the corresponding row of the table. Then, packet β2 is sent with second index value j equal to 1=2−1 and packet β3 with j=3−2=1.

At time t13, packet β3 has been sent and the last sequence number 3 is stored in the corresponding row of the table.

At time t14, packet α1 has been acknowledged by reception of acknowledgement packet ACK1. Since there is no outstanding packet on the virtual circuit α, the special value NULL is set in the row including α.

At time t15, a packet β5 has been sent with a sequence number 5. The value 5 is set in a row including β in the table.

At time t16, a packet β8 has been sent with a sequence number 0 (8 modulo 8). The value 0 is set in a row including β in the table.

At time t17, a packet α2 has been sent with the sequence number 1 and value 1 is set in a row including α in the table.

At time t18, acknowledgement packet ACK1 has acknowledged a packet with sequence number 0, which is stored in a row including β in the table.

At time t19, acknowledgment ACK2 has acknowledged a packet with sequence number 1. Special value NULL is stored in a row including α in the table.

Figure 11:
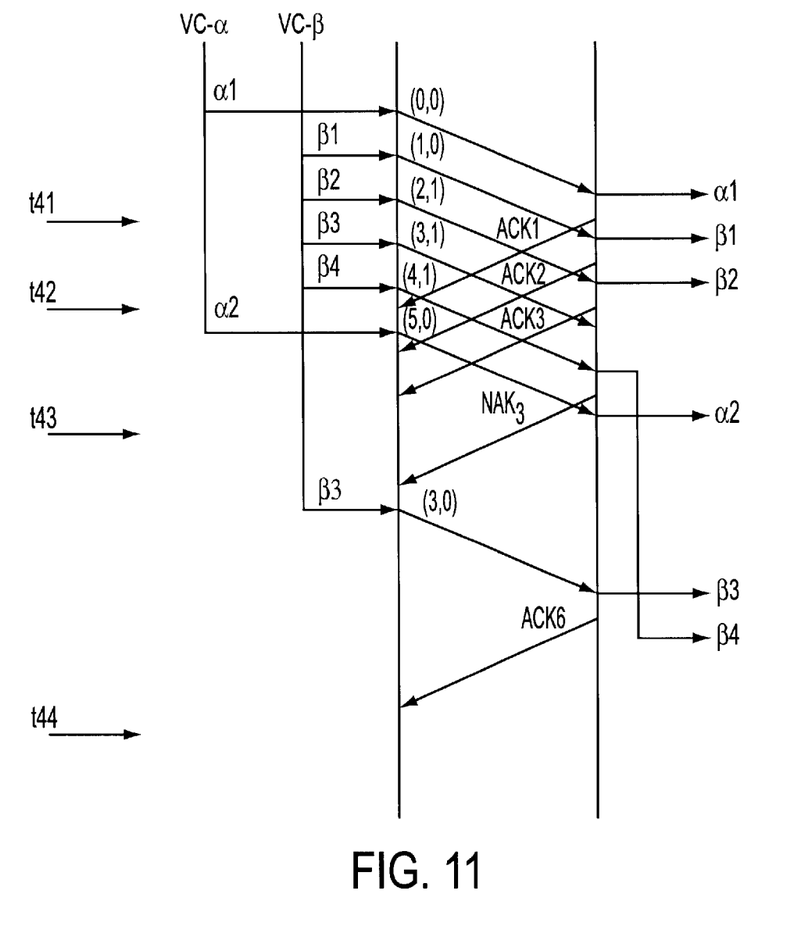
FIG. 11 is a diagram illustrating an example of an embodiment of the present invention.

FIG. 11 shows another example wherein the second index value j can be seen to be updated when a retransmission is performed. When packet β3 is sent for the first time, its second index value is 1. But when the same packet is retransmitted, since the previous packet β2 has been acknowledged by acknowledgment packet ACK3, then the second index value of retransmitted packet is changed to zero, meaning that no resequencing is needed if this packet is received correctly.

Figure 12:
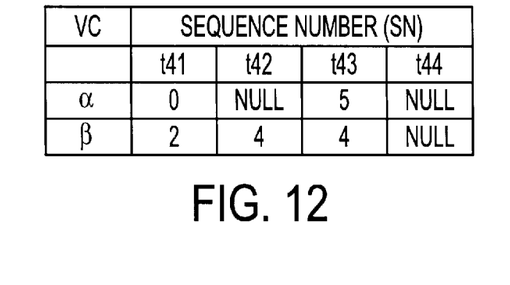
FIG. 12 is a table which is used in an embodiment of the present invention, in which the stored values are those corresponding to the diagram of FIG. 11.

FIG. 12 shows the changes of the table for time instances t41, t42, t43, t44 in FIG. 11.

At time t41, last sequence numbers for virtual circuits VC-α and VC-β are respectively 0 and 2 that are stored in the corresponding row in the table.

At time t42, acknowledgment packet ACK1 acknowledged packet α1 and since there is no outstanding packet on the virtual circuit α, the special value NULL is set in row including α.

At time t43, acknowledgment packet ACK3 acknowledged packet β2. But there are two outstanding packets β3 and β4, so that the last sequence number is set in a row including β.

At time t44, acknowledgment packet ACK6 acknowledged retransmitted packet β3 and also packets β4 and α2. Since there is no outstanding packet, special value is assigned to both virtual circuits VC-α and VC-β.

It should be noted that, when acknowledgment packet ACK6 is received, this acknowledges three packets β3, β4 and α2. The update of The table has to be done for both two virtual circuits α and β at this time.

In the previous embodiment of the invention, the number of virtual circuits is known and steady. But there is a case where a large number of virtual circuits are multiplexed at the input of the transmitter, or the number cannot be prescribed. This is the case when connectionless packets are transmitted, where the order in the sequence of packets having the same packet address has to be preserved, while there is no need of keeping the order of packets which have different packet addresses. Here, the packet address means either a destination address of a packet or a source and destination address pair of a packet.

According to another embodiment of the invention, the method consists in implementing, at the transmitter side, a table which has a predefined number of rows, and for associating a value with a virtual circuit, in storing said value and an identifier of said virtual circuit in a row which is free at the moment, and for deleting such an association, in making free the corresponding row.

Therefore, the address of the last sent packet is added with respect to the previous embodiment to the table. Each row of the table indicates the address and the sequence number of the last packet sent with this address. If all outstanding packets having the same packet address have been acknowledged, the packet address has to be deleted in the table in order to make another packet address be stored in the table.

Since the maximum number of outstanding packets is limited to the modulo value determined by the sequence number size, the maximum size of the table is limited to the modulo size of the sequence number.

The mechanism is the same as the one previously described except that the transmitter, when a packet with a given address is to be transmitted, checks if this address has already been stored in the table. If it has not been, the address is added to the table with a sequence number of the packet transmitted. If it has been, the mechanism is the same as previously.

By introducing this mechanism, unlimited number of packet addresses or virtual circuits can be handled.

Figure 13:
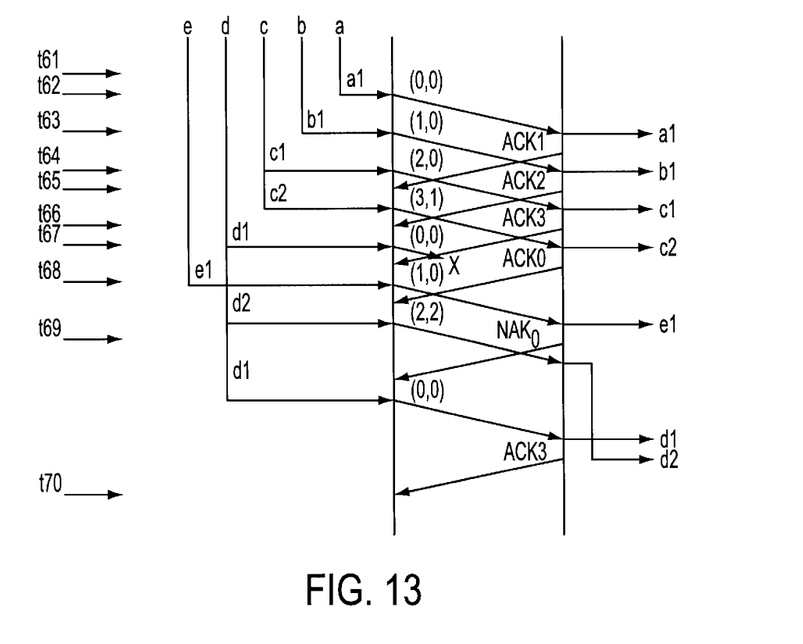
FIG. 13 is a diagram illustrating an example of another embodiment of the present invention.

FIG. 13 shows an example of such an embodiment. In this case, where 5 kinds of packet addresses a, b, c, d, e are used and the size of sequence number is 2 bits (four values 0 to 3 are used as sequence number). The maximum number of outstanding packets are 3 so that the table (representated in FIG. 14) has three rows for storing both addresses and sequence numbers.

Figure 14:
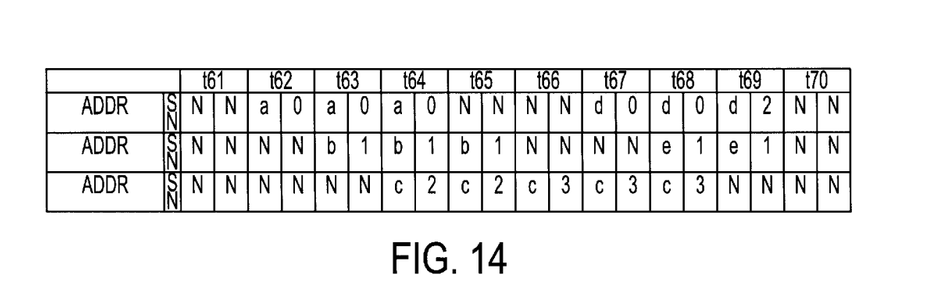
FIG. 14 is a table which is used in the preceding embodiment of the present invention, in which the stored values are those corresponding to the diagram of FIG. 13.

FIG. 14 shows the change of the table for instances t61, t62, . . . t70 as illustrated in FIG. 13. N is the special value NULL.

At time t61, no packet has been sent so that all rows of The table are set to NULL (both addresses and sequence numbers for each of the three potential addresses).

At time t62, when a packet a1 with address a is sent, the transmitter allocates one row (first one) of the table to address a, and sets the packet address a and a sequence number equal to zero. The second index value j assigned to the packet a1 also equals to zero since there is no outstanding packet for this address.

At time t63, when a packet b1 is sent, the transmitter allocates another row (second one) to the table for address b, and sets the packet address b and the sequence number 1 since this is the sequence number of the last packet transmitted with this address. The second index value j assigned to the packet b1 also equals to zero.

At time t64, when a packet c1 is sent, the transmitter allocates another row (third row) to the table for address c, and sets the packet address c and its sequence number 2 to the row. The second index value j assigned to the packet c1 also equals to zero.

At time t65, when ackownledgment packet ACK1 is received, since there is no outstanding packet having address a, the transmitter set the row allocated to address a, to NULL (both address and sequence number).

At time t66, when ackownledgment packet ACK2 is received, since there is no outstanding packet having address b, the transmitter set the row allocated to address b to NULL.

At time t67, the transmitter allocates one row (the first one), which was NULL, to address d, and sets the packet address d and sequence number 0. The second index j of the packet d1 equals zero since the value of the sequence number was set to N at the preceding time.

At t68, after packet e1 has been transmitted, the transmitter allocates one row (second one), which was NULL, to address e, and sets to the row the packet address e and sequence number 1. The second index j of the packet e1 equals zero since the value of the sequence number was set to N at the preceding time.

At time t69, since the packet c2 has been acknowledged, the third row of the table is set to NULL. A packet d2 has also been sent and the sequence number of address d is updated to 2 since this is the sequence number of the packet d2. Since at the preceding time, the value of the sequence number in the row is not N but zero, the second index j is set to the difference between the sequence number (i.e. 2) of the packet to be transmitted and the sequence number in the row (i.e. 0) which is then equal to 2.

At time t70, when ackownledgment packet ACK3 is received, all packets having address d and e are acknowledged. Then, NULL is stored for the rows assigned to both addresses d (the first row) and e (the second row).

Since the size of a packet address is generally large, such as several bytes, it is better that the table is sorted based on registered addresses.

According to another embodiment of the invention, the method consists in creating a memory block in which said value and said packet address are stored and in linking said block with other blocks still created for other packet addresses, if they exist, so that to create a list of blocks and, for deleting such an association formed by a block, remove said block from the list of blocks.

Note that the table can then be dynamically configured by sorting the double linked list.

Figure 15:
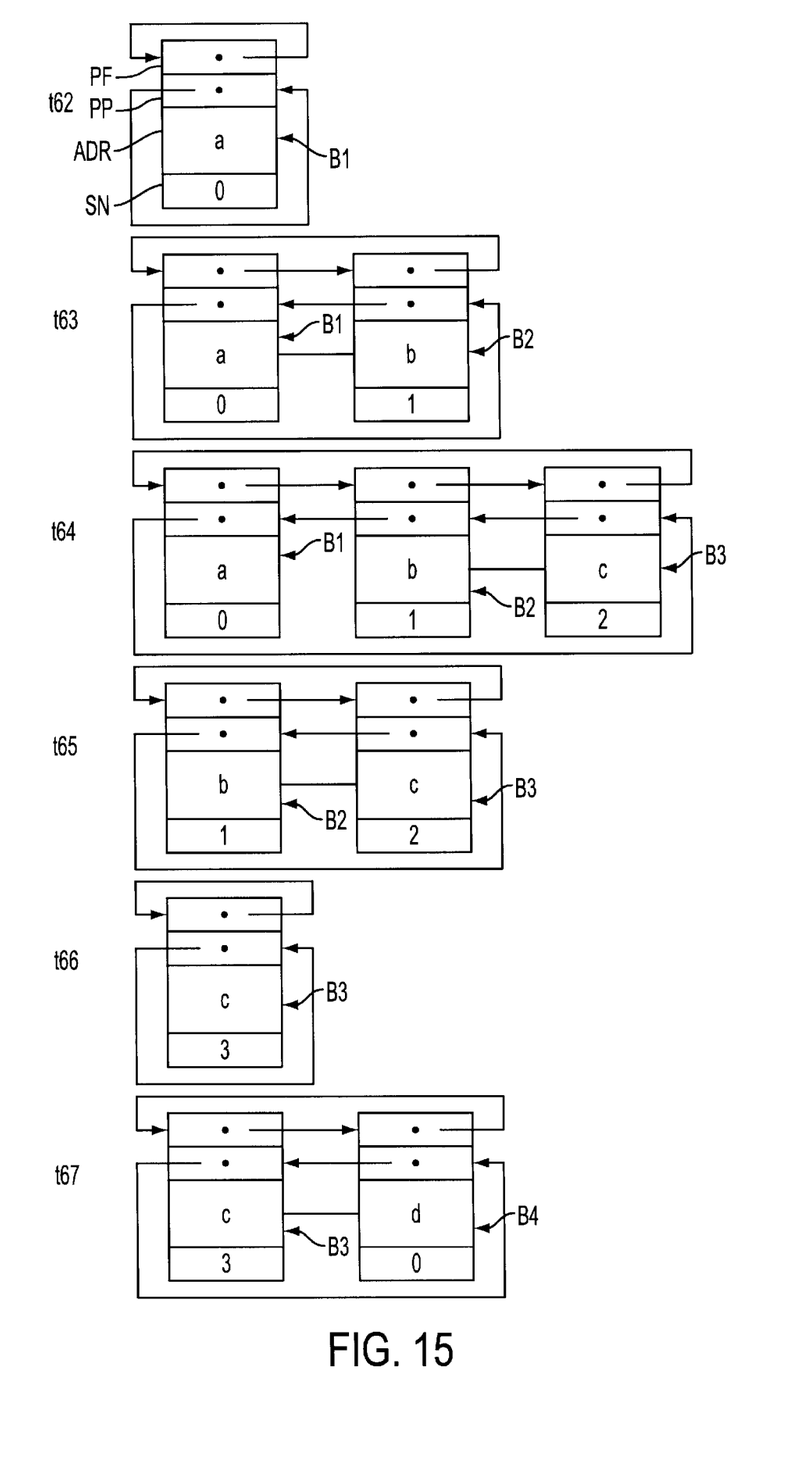
FIG. 15 is a diagram showing blocks which are double list linked.

FIG. 15 shows the table configured by double linked list.

When a new packet address is added, a new memory block is allocated and the packet address and sequence number are stored in the block. Then the block is linked with other blocks of the list and thus inserted in the list. When an packet address is deleted, corresponding memory block is removed from the list and the link is reconfigured.

FIG. 15 shows the change of configuration for time instances t62, t63, t64, t65, t66, t67 depicted in FIG. 13.

Each block has four fields. Two contain the address ADDR and sequence number SN of the pointed packet. A third contains a pointer PP to the preceding block and the last a pointer PF to the following block. Both last fields are used to constitute the link of the blocks of the list.

At the beginning of the process, at time t61 in FIG. 13, there is no block.

At time t62, when a packet α1 with address a is sent, the transmitter creates a block B1 and sets the fields ADDR and SN with the packet address a and a sequence number equal to zero, since this is the sequence number of the last packet transmitted with this address a.

At time t63, when a packet b1 is sent, the transmitter creates a new block B2 which is linked to block B1 by means of the respective pointer fields PF and PP of both blocks B1 and B2. The transmitter sets then the fields ADDR and SN of block B2 with the packet address b and a sequence number equal to 1, since this is the sequence number of the last packet transmitted with this address b.

At time t64, when a packet c1 is sent, the transmitter creates a third block B3 which is linked to the other blocks B1 and B2 by means of the pointer fields PF and PP of all the blocks of the list. The transmitter sets then the fields ADDR and SN of block B3 with the packet address c and its sequence number 2.

At time t65, when the ackownledgment packet ACK1 is received, since there is no outstanding packet having address a, the transmitter deletes the block B1 and makes blocks B2 and B3 linked.

Note, there is basically no memory block including NULL in an address field since, when a block should include NULL values, it is removed from the list.

At time t66, when ackownledgment packet ACK2 is received, since there is no outstanding packet having address b, the transmitter deletes the block B2 and makes block B1 self-linked.

At time t67, the transmitter creates a new block B4 with the packet address d and sequence number 0, which is assigned to the packet d1.

Rather than use the packet address which is generally a multi-bytes value, a random number, which is much smaller than packet address, is calculated from the packet address and is used as an equivalent to virtual circuit identifier. This can be applied either to the table embodiment or to doubled linked list embodiment. For instance, such calculation is to take bit by bit EXOR for all bytes of packet address and to get one byte random number 0–255. This value is used as virtual circuit identifier.

Another method can be to divide the packet address value by some prime number, for example 253, and get a remainder, which is also a random number ranging 0–252. Since the value of the random number takes small range, a table can be looked up directly by using the random number as an offset of an zero address of the table.

In these schemes, the resequencing is done for each random number independently. Since it is expected that different packet address produces different random number, the resequencing is generally done for each different packet address. But, there is a possibility that different packet addresses produce the same random number. In this case, sequence of packets are preserved unnecessarily among the addresses producing the same random number. By increasing the range of the random number, such possibility can be reduced.

What is claimed is:

1. Method of controlling errors in the transmission of packets transmitted between a transmitter and a receiver, said transmitter receiving from an input multiplex packets belonging to a plurality of end to end associations and transmitting them in the form of sequences of packets over a transmission line, said receiver, on reception of a packet, verifying whether said packet is correctly received and if so, delivering said packet to an output multiplex, and if not, sending to said transmitter a negative acknowledgment so that the transmitter can retransmit said packet, characterized in that it comprises, at the transmitter side, of allocating, to each packet to be transmitted over the transmission line, two indices, a first index giving a sequence number of said packet and a second index enabling said packet to point to the last packet which was previously transmitted belonging to the same end to end association as said packet, and, at the receiver side, determining, on a correct reception of a packet, the packet pointed to by said received packet, and, if this packet pointed to has been delivered to the output multiplex, then delivering said received packet, otherwise not delivering said received packet.

2. Method according to claim 1, characterized in that it comprises, at the receiver side, keeping packets which are not delivered and delivering, when correctly received, a re-transmitted packet and then seeking amongst the kept packets the one, if said kept packet exists, which points to said re-transmitted packet and then delivering said packet which points to said retransmitted packet, and again seeking, if it exists, the packet which points to said packet which points to said re-transmitted packet and delivering said packet which points to said packet which points to said re-transmitted packet until there is no packet which points to a packet delivered lastly.

3. Control method according to claim 2, characterized in that the second index represents a sequence number of said last packet which was previously transmitted belonging to the same end to end association as the considered packet.

4. Control method according to claim 2, characterized in that the second index represents a difference between a sequence number of said last packet which was previously transmitted and a sequence number of said considered packet which was received, and these packets belong to the same end to end association.

5. Control method according to one of claim 4, characterised in that, at the transmitter, there is allocated to a packet to be transmitted a specific value as the second index when the value which said second index should normally take is higher than a value upwardly delimiting said second index and, at the receiver, on the receipt of a packet whose second index has this specific value, it is determined whether all packets of the sequence belonging to all the end to end associations or to all the groups of associations previously sent by the transmitter have already been received by the receiver and delivered to the output multiplex, and if this is the case, the packet just received is delivered, otherwise the packet just received will be kept until all the previous packets are delivered.

6. Control method according to claim 3, characterised in that the second index also bears an item of information indicating a transmission line over which said packet pointed to was transmitted.

7. Control method according to claim 1, characterised in that it comprises in allocating to each end to end association or each group of associations for which at least a packet has not been still acknowledged, an allocated value which is equal to the sequence number of the last packet of said end to end association or said group of end to end associations which have not been still acknowledged, and when transmitting a packet belonging to an end to end association or to a group of end to end associations, in checking if a value is associated with said end to end association or group of end to end associations and if it is, in setting the second index value of said packet to the difference modulo M between the sequence number of the packet to be transmitted and the allocated value, M being the modulo size of the sequence number, and if it is not, in setting the second index value of said packet to zero and, after having transmitted said packet, in allocating the value of the sequence number of said packet to said end to end association or said group of end to end associations.

8. Control method according to claim 7, characterised in that it comprises, when retransmitting a packet, either in allocating the same sequence number and the same second index to the retransmitted packet if the packet pointed by said packet has not been acknowledged, or in updating to zero the second index value of the retransmitted packet if it has been acknowledged.

9. Control method according to either claim 7, characterised in that it comprises, when an acknowledgment packet is received, in getting the identifier of the end to end association or the group of end to end associations of the acknowledged packet, in finding the value allocated to said end to end association or the same group of end to end associations and, if said allocated value is equal to the sequence number of said acknowledged packet, in deleting the allocation, and if the sequence number is different from the associated value, in letting the allocated value as it is.

10. Control method according to claim 8, characterised in that it comprises, for judging whether the pointed packet is acknowledged or not, in checking whether the condition:

$$\{(R-P) \text{ modulo } M\} \geq \{(R-Q) \text{ modulo } M\}$$

is satisfied or not, where R is the sequence number of the retransmitted packet, P the sequence number of the pointed packet by the retransmitted packet, Q the sequence number of the last acknowledged packet and M the size of modulo.

11. Control method according to claim 8, characterised in that it comprises, for judging whether the pointed packet is acknowledged or not, in checking whether the condition:

$$\{\text{Original second index value of the retransmitted packet}\} \geq \{(R-Q) \text{ modulo } M\}$$

is satisfied or not, where R is the sequence number of the retransmitted packet, Q the sequence number of the last acknowledged packet and M the size of modulo.

12. Control method according to claim 7, characterised in that it comprises in implementing, at the transmitter side, a table which has a row per end to end association or per group of end to end associations, and for allocating a value to an end to end association or to a group of end to end associations, in storing said value in said row, and, for deleting such an allocation, in storing a special value in the corresponding row.

13. Control method according to claim 7, characterised in that it comprises in implementing, at the transmitter side, a table which has a predefined number of rows, and for allocating a value to an end to end association or to a group of end to end associations, in storing said value and an identifier of said end to end association or said group of end to end associations in a row which is free: at the moment, and, for deleting such an allocation, in making free the corresponding row.

14. Control method according to claim 13, characterised in that the maximum size of said table is limited to the modulo size of the sequence number.

15. Control method according to claim 7, characterised in that it comprises, for allocating a value to an end to end association or to a group of end to end associations, in creating a memory block in which said value and an identifier of said end to end association or group of end to end associations are stored and in linking said block with other blocks still created for other end to end associations or groups of end to end associations, if they exist, so that to create a list of blocks and, for deleting such an allocation formed by a block, remove said block from the list of blocks.

* * * * *